(12) United States Patent
Hiroshige et al.

(10) Patent No.: US 7,148,924 B2
(45) Date of Patent: Dec. 12, 2006

(54) IMAGE PROCESSING METHOD, IMAGE PROCESSING PROGRAM, IMAGE PROCESSING APPARATUS, AND DIGITAL STILL CAMERA USING THE IMAGE PROCESSING APPARATUS

(75) Inventors: Akira Hiroshige, Nagano (JP); Yoshihiro Nakami, Nagano (JP)

(73) Assignee: Seiko Epson Corporation, Tokyo (JP)

(*) Notice: Subject to any disclaimer, the term of this patent is extended or adjusted under 35 U.S.C. 154(b) by 753 days.

(21) Appl. No.: 10/162,712

(22) Filed: Jun. 6, 2002

(65) Prior Publication Data

US 2002/0196355 A1    Dec. 26, 2002

(30) Foreign Application Priority Data

Jun. 7, 2001   (JP) .......................... P.2001-172611
Apr. 9, 2002   (JP) .......................... P.2002-106930

(51) Int. Cl.
*H04N 5/208*   (2006.01)
*G06K 9/40*    (2006.01)

(52) U.S. Cl. ...................................... 348/252; 382/266

(58) Field of Classification Search ................ 348/252, 348/630, 631, 625; 382/266, 267, 268, 269
See application file for complete search history.

(56) References Cited

U.S. PATENT DOCUMENTS 6,011,585 A *   1/2000   Anderson ..................... 348/272
6,343,146 B1 *  1/2002   Tsuruoka et al. ............ 382/163

* cited by examiner

*Primary Examiner*—David Ometz
*Assistant Examiner*—Adam L Henderson
(74) *Attorney, Agent, or Firm*—Sughrue Mion, PLLC (57) ABSTRACT

Electronic data output from CCD is separated into a brightness component Y and color difference components Cb and Cr and an edge is extracted for each of the components. The edge amounts are calculated from the extracted edges and the component having the maximum edge amount is selected. Edge information (for example, edge gradient direction) is calculated based on the selected component having the maximum edge amount, a filter is selected based on the calculated edge information about the component having the maximum edge amount, and smoothing processing is performed for the electronic data output from the CCD based on the filter. The electronic data subjected to the smoothing processing is written into flash memory.

4 Claims, 5 Drawing Sheets

| Mg | G | Mg | G | Mg | G |
|----|---|----|---|----|---|
| Cy | Ye | Cy | Ye | Cy | Ye |
| Mg | G | Mg | G | Mg | G |
| Cy | Ye | Cy | Ye | Cy | Ye |
| Mg | G | Mg | G | Mg | G |

IMAGE PROCESSING METHOD, IMAGE PROCESSING PROGRAM, IMAGE PROCESSING APPARATUS, AND DIGITAL STILL CAMERA USING THE IMAGE PROCESSING APPARATUS

The present application is based on Japanese Patent Applications Nos. 2001-172611 and 2002-106930, which are incorporated herein by reference.

BACKGROUND OF THE INVENTION

1. Field of the Invention

This invention relates to an image processing method, an image processing program, an image processing apparatus, and a digital still camera using the image processing apparatus.

2. Description of the Related Art

With an image input unit, such as a digital still camera (simply, digital camera) using image input means of CCD, etc., the image input means may output not only an electric signal responsive to the amount of received light, but also an unnecessary electric signal. This unnecessary electric signal is contained in electronic data output from pixels making up an image as noise.

Hitherto, to remove noise contained in an image, edges contained in the image have been detected from the output electronic data and information concerning the detected edges has been used to determine the smoothing range for performing image processing of noise removal, etc. For example, using information concerning the detected edges, in the proximity of each edge, smoothing has been performed in a narrow range along the edge and in the surroundings of remote pixels from the edge, smoothing has been performed in a wide range.

To detect an edge, generally, output values of electronic data output from the pixels making up a matrix centering on a pixel of interest (for example, matrix of 3×3 pixels, 5×5 pixels, etc.,) are used. The electronic data output from the pixels of the image input means is separated into a brightness component and a color difference component when image processing is performed. To detect an edge as described above, the brightness component separated from the electronic data is used.

To use the brightness component to detect an edge, if the image is an image with large change in brightness component for each pixel like an image of photographing a landscape or a portrait, for example, an edge can be detected effectively.

However, for an image with small brightness change, but with large hue change like an image of photographing a picture pattern printed on clothing, for example, if the brightness component is used for detecting an edge, it is feared that the edge which should be actually contained in the image may not be detected.

That is, in the image processing method in the related art using only the brightness component, if an edge of the brightness component is not contained in and an edge of the color difference component is contained in the pixel of interest, no edge may be detected. Consequently, smoothing is also performed in the surroundings of the edge and there is a fear of incurring breaking of the image.

The number of pixels of the electronic data output from the image input means depends on the number of pixels of the image input means. Thus, to form an image having a larger number of pixels than that of the electronic data output from the image input means, pixels need to be interpolated.

SUMMARY OF THE INVENTION

It is therefore an object of the invention to provide an image processing method, an image processing program, an image processing apparatus, and a digital still camera using the image processing apparatus for improving the edge detection accuracy regardless of the type of image.

In the image processing method, the image processing program, or the image processing apparatus of the invention, electronic data is separated into a brightness component and a color difference component and the edge amount is calculated for each of the provided brightness component and color difference component. The component having the maximum edge amount is selected from the calculated edge amounts, namely, the brightness component edge amount and the color difference component edge amount, and the selected component is of the maximum edge amount. The edge information about the selected component of the maximum edge amount is calculated and the electronic data is processed based on the edge information. The edge information is, for example, the edge magnitude, namely, the output value change amount of the electronic data and the edge direction, namely, the output value changing direction of the electronic data.

The component having the maximum edge amount is selected from the brightness component edge amount and the color difference component edge amount, whereby in the color space of Y (brightness), Cb (color difference 1), and Cr (color difference 2), for example, the edge of the color difference component Cb or Cr having the larger edge amount can be detected even when the change amount of the brightness component Y is small. Thus, if the edge of the brightness component cannot be detected, the edge of the color difference component can be detected and the edge detection accuracy can be improved. Therefore, the edge detection accuracy can be improved regardless of the type of image.

In the image processing method, the image processing program, or the image processing apparatus of the invention, a set of data each having R, G, and B color components are obtained, and the edge amount may be calculated for each of the provided color components. The color component having the maximum edge amount is selected from the calculated edge amounts, namely, the color component edge amounts, and the selected component is of the maximum edge amount. The edge information about the selected component of the maximum edge amount is calculated and the electronic data is processed based on the edge information.

The color component having the maximum edge amount is selected from among the color components, whereby in the color space of the primary colors of R (red), G (green), and B (blue), for example, even when the change amount of the R component is small, the edge of any other color component G or B having the larger edge amount can be detected. Thus, if the edge of one color component cannot be detected, the edge of any other color component can be detected and the edge detection accuracy can be improved. Therefore, the edge detection accuracy can be improved regardless of the type of image.

Further, in the image processing method or the image processing program of the invention, the maximum edge amount is selected and the edge information is calculated for each pixel. Thus, the edge contained in an image can be detected in pixel units. Therefore, the edge detection accuracy can be improved and the image processing accuracy can be enhanced.

Further, the image processing of the invention is applied to a digital camera, whereby the image processing accuracy can be enhanced and a finer image can be provided.

Features and advantages of the invention will be evident from the following detailed description of the preferred embodiments described in conjunction with the attached drawings.

BRIEF DESCRIPTION OF THE DRAWINGS

In the accompanying drawings:

FIGS. 5A and 5B are schematic representations to show a Prewitt operator.

DETAILED DESCRIPTION OF THE PREFERRED EMBODIMENTS

Referring now to the accompanying drawings, there is shown a preferred embodiment of the invention.

Figure 2:
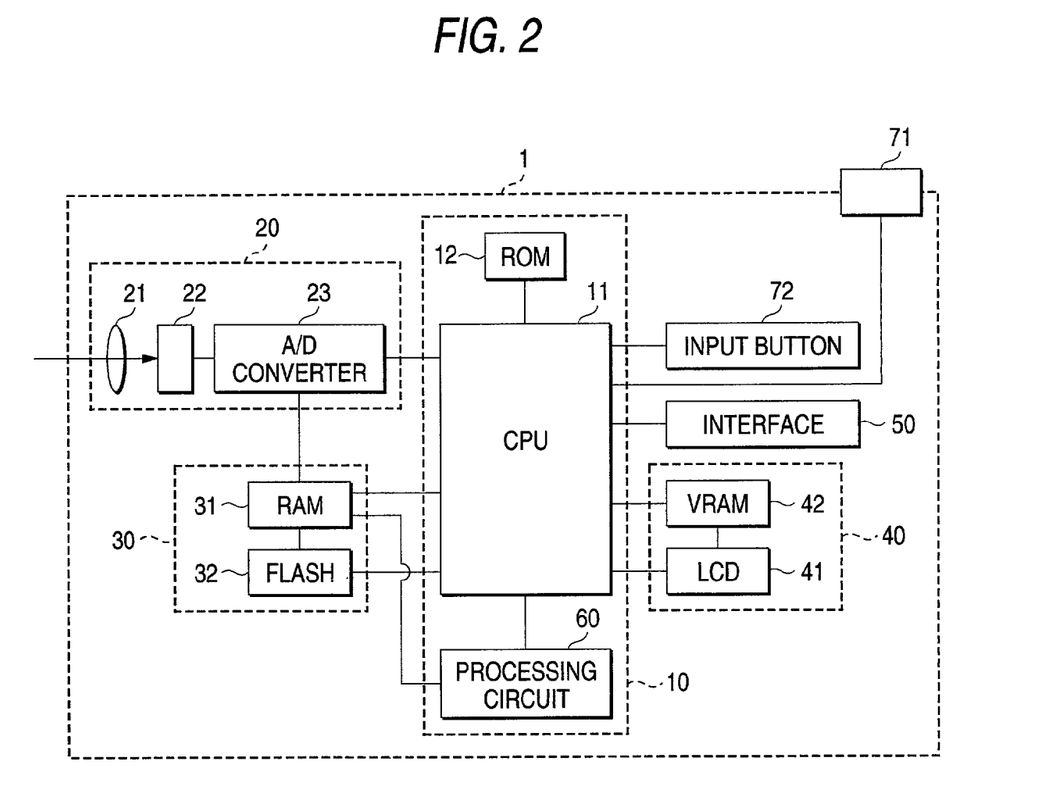
FIG. 2 is a block diagram to show the digital camera according to the embodiment of the invention.

FIG. 2 shows a digital camera 1 incorporating an image processing apparatus according to one embodiment of the invention.

As shown in FIG. 2, the digital camera 1 is made up of a control section 10, image input means 20, a record section 30, a display section 40, an interface 50, and this like.

The control section 10 is electric circuitry for processing electronic data output from the image input means 20. It has a CPU (Central Processing Unit) 11, ROM (Read-Only Memory) 12, and a processing circuit 60. The ROM 12 records a computer program executed by the CPU 11 and the processing circuit 60 of the control section 10.

Figure 3:
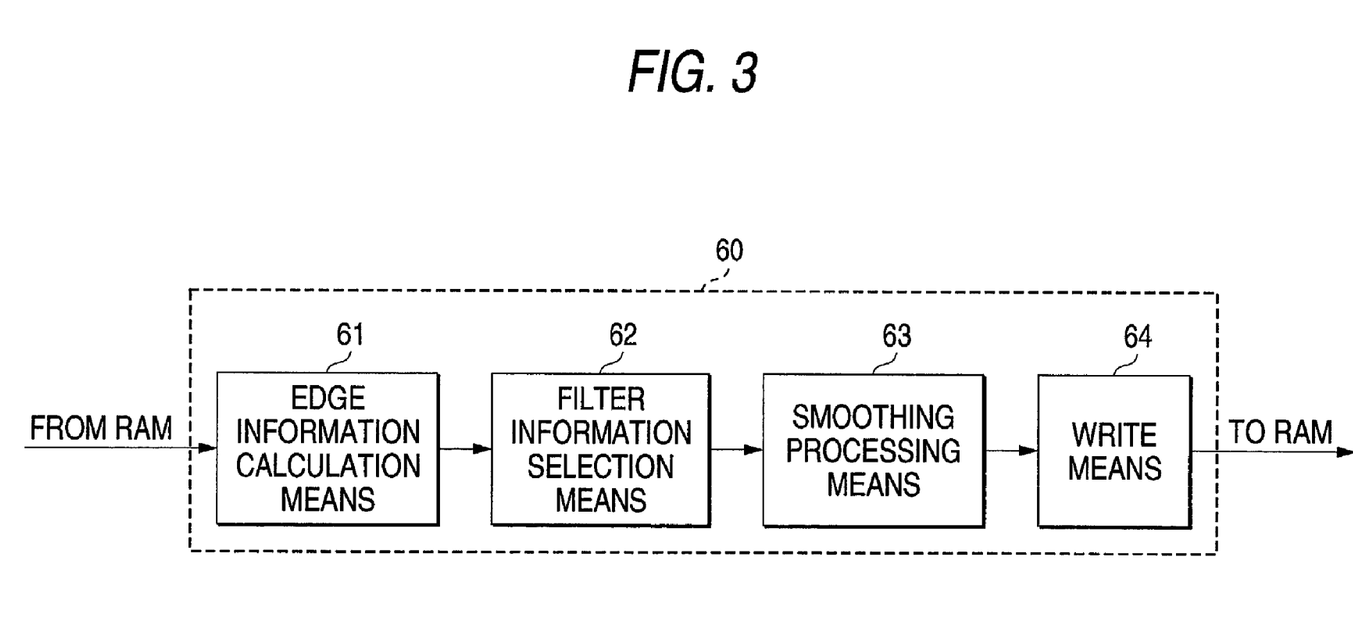
FIG. 3 is a block diagram to show details of a processing circuit of the digital camera according to the embodiment of the invention.

As shown in FIG. 3, the processing circuit 60 is made up of edge information calculation means 61, filter information selection means 62, smoothing processing means 63 as image processing means, and write means 64 as record means.

As shown in FIG. 2, input means for accepting entry from the user is connected to the control section 10. The input means includes a shutter button 71 for the user to enter an execution command of photographing, a plurality of input buttons 72 for the user to operate various functions of the digital camera 1, and the like.

The image input means 20 has a condensing lens 21, CCD 22, and an A/D converter 23. The condensing lens 21 gathers light from a subject on the CCD 22. The CCD 22 has a plurality of image pickup devices arranged like a matrix in horizontal and vertical directions, and one image pickup device forms one pixel.

Figure 4:
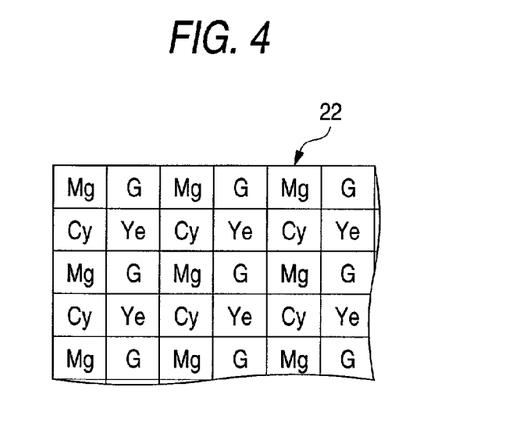
FIG. 4 is a schematic drawing to show CCD of the digital camera according to the embodiment of the invention.

Color filters are placed on the light reception side of the image pickup devices. As the color filters, complementary color filters made up of Cy (Cyan), Mg (Magenta), Ye (Yellow), and G (Green) are used. The complementary color filters of the CCD are placed, for example, as shown in FIG. 4. Each color filter transmits light of the colors of the three primary colors of light as follows: Cy=G+B, Mg=B+R, and Ye=G+R. That is, one filter allows light of two colors to pass through.

Light incident on each image pickup device of the CCD 22 is converted into an electric signal for output. The electric signal output from the CCD 22 is an analog signal and thus is converted into digital electronic data by the A/D converter 23.

The record section 30 has RAM (Random Access Memory) 31 and flash memory 32. DRAM (Dynamic RAM) having a self-refresh function is used as the RAM 31. The flash memory 32 is a rewritable record medium capable of retaining the record contents if it is not energized, and is contained in the digital camera 1 or is detachably attached to the digital camera 1.

The RAM 31 temporarily records digital electronic data processed by the control section 10 or output from the A/D converter 23. The flash memory 32 stores the electronic data temporarily recorded in the RAM 31. Filter information described later is also recorded in the flash memory 32.

The display section 40 has a liquid crystal display (LCD) 41 and VRAM (Video RAM) 42. The LCD 41 displays an image based on the electronic data recorded in the flash memory 32 or the digital electronic data output from the A/D converter 23. Display data prepared from electronic data for display on the LCD 41 is recorded in the VRAM 42.

The interface 50 outputs the electronic data recorded in the flash memory 32 to an external machine, such as a personal computer.

Next, processing of the control section 10 will be discussed in detail.

The control section 10 comprises the processing circuit 60 as described above. The processing circuit 60 is a dedicated arithmetic unit for executing image processing. The processing circuit 60 executes predetermined processing by a computer program recorded in the ROM 12 In the embodiment, smoothing processing for removing noise contained in electronic data will be discussed as an example of image processing.

Figure 1:
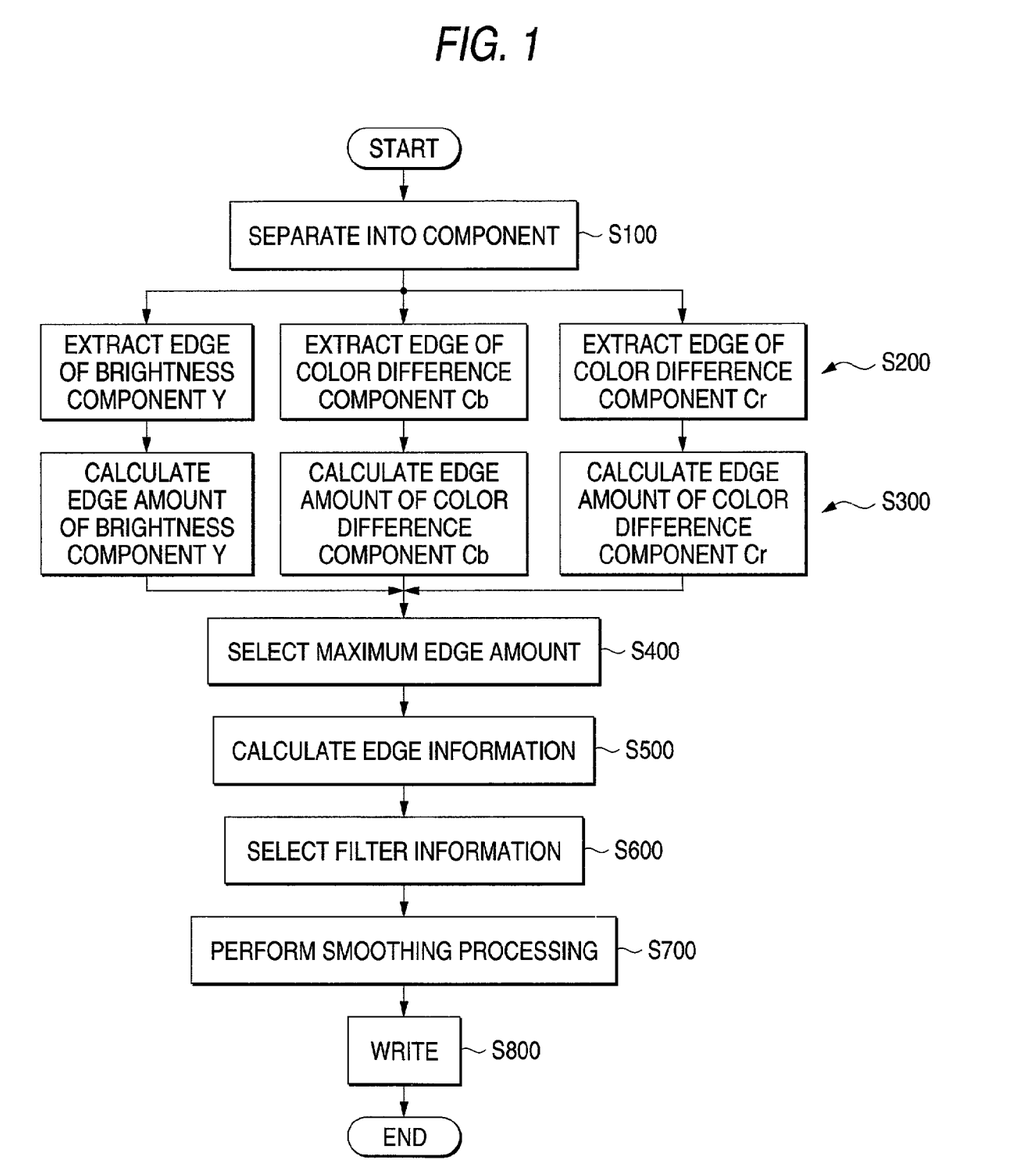
FIG. 1 is a flowchart to show a flow of an image processing method using a digital camera according to one embodiment of the invention.

Processing executed by each means of the processing circuit 60 and a flow of the processing will be discussed with reference to FIGS. 1 and 3. The processing executed by each means of the processing circuit 60 is performed as pipeline processing without using the CPU 11.

(Edge Information Calculation Means)

The edge information calculation means 61 executes edge extraction processing from the electronic data of an image output from the image input means. It calculates the edge amount from the extracted edge.

The edge extraction processing is executed based on the electronic data output for each pixel of the CCD 22. The electronic data output from each pixel contains a brightness component and a color difference component and thus is separated into a brightness component and a color difference component before the edge extraction processing is executed (S100). In the embodiment, an example wherein YCbCr color space of brightness component Y and color difference components Cb and Cr is used will be discussed.

With the CCD 22 having the color filters of four colors as shown in FIG. 4, the brightness component Y and the color difference components Cb and Cr are calculated from output values of electronic data output from four pixels contiguous with the pixel of interest.

Edge extraction processing is executed for each component from the brightness component Y and the color difference components Cb and Cr calculated (S200). As a method of the edge extraction processing, a Prewitt operator to find the differentiation value of pixel is used. The Prewitt operator is indicated by the following expression: (The pixel of interest is P (i, j) as shown in FIG. 5.)

$$\Delta fx = \{P(i+1, j-1) - P(i-1, j-1)\} +$$
$$\{P(i+1, j) - P(i-1, j)\} + \{P(i+1, j+1) - P(i-1, j+1)\}$$
$$\Delta fy = \{P(i-1, j-1) - P(i-1, j+1)\} +$$
$$\{P(i, j-1) - P(i, j+1)\} + \{P(i+1, j-1) - P(i+1, j+1)\}$$

Figure 5A:
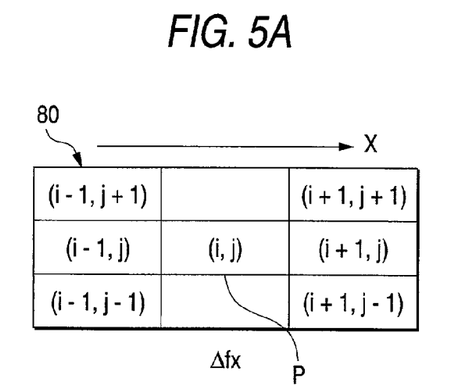
FIG. 5A is a schematic representation to show edge detection in an X direction and FIG. 5B is a schematic representation to show edge detection in a Y direction.
Figure 5B:
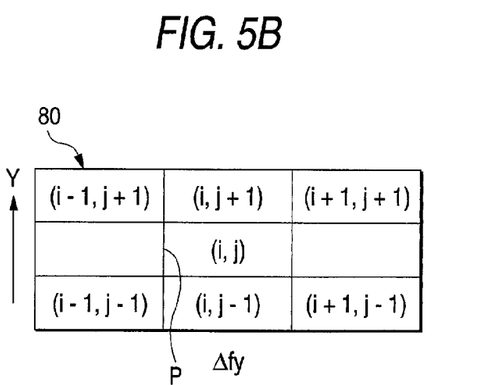

In the expression, edge extraction is performed based on the electronic data output from the pixels in the proximity of the pixel of interest P as shown in FIG. 5, the pixels making up a 3×3 matrix 80 centering on the pixel of interest P in the embodiment. In the edge extraction, the edge components in the arrow X direction and the arrow Y direction in FIG. 5 are detected. Output from the pixels as the electronic data is 256-step gradation data of 0 to 255, for example, if output is eight-bit data.

Next, from the extracted edges in the above-mentioned expression, the edge gradient magnitude, namely, the edge amount is calculated for each of the brightness component Y and the color difference components Cb and Cr (S300). The edge amount G is calculated according to the following expression (A):

[Expression 1]

$$G(\varphi) = \sqrt{\Delta f_x^2 + \Delta f_y^2} \qquad (A)$$

The edge amount may be calculated according to the following expression (A1) or (A2) in place of the expression (A): (Expression (A1) or (A2) makes it possible to find the edge amount at higher speed.)

[Expression 2]

$$G(\varphi) = |\Delta f_x| + |\Delta f_y| \qquad (A1)$$

[Expression 3]

$$G(\varphi) = \max(\Delta f_x, \Delta f_y) \qquad (A2)$$

The edge refers to a portion where the gradation of the electronic data output from pixel changes largely, namely, the boundary portion between objects contained in the image. On both sides of the edge, the gradation of the electronic data output from pixel changes largely.

The edge information calculation means 61 calculates the edge amount G for each pixel of the CCD 22 based on the expression (A). The edge amount is calculated for each of the brightness component Y and the color difference components Cb and Cr as described above.

The edge amounts calculated for the brightness component Y and the color difference components Cb and Cr are Gy, Gcb, and Gcr respectively. When calculating the edge amounts Gy, Gcb, and Gcr, the edge information calculation means 61 selects the component having the largest edge amount, namely, maximum edge amount Gmax from among the edge amounts Gy, Gcb, and Gcr calculated about the pixel of interest (S400). In the embodiment, as an example, the color difference component Cb is the component having the maximum edge amount Gmax, namely, the selected component.

When the component having the maximum edge amount Gmax is selected, edge information is calculated for the component (S500). The edge information is information consisting of the edge amount G and edge gradient direction θg. Therefore, when the edge information calculation means 61 selects the color difference component Cb as the component having the maximum edge amount Gmax, then it calculates the edge information about the color difference component Cb. The edge gradient direction θg is calculated according to the following expression (B):

[Expression 4]

$$\theta_g = \tan^{-1}\left(\frac{\Delta f_y}{\Delta f_x}\right) \qquad (B)$$

Figure 6:
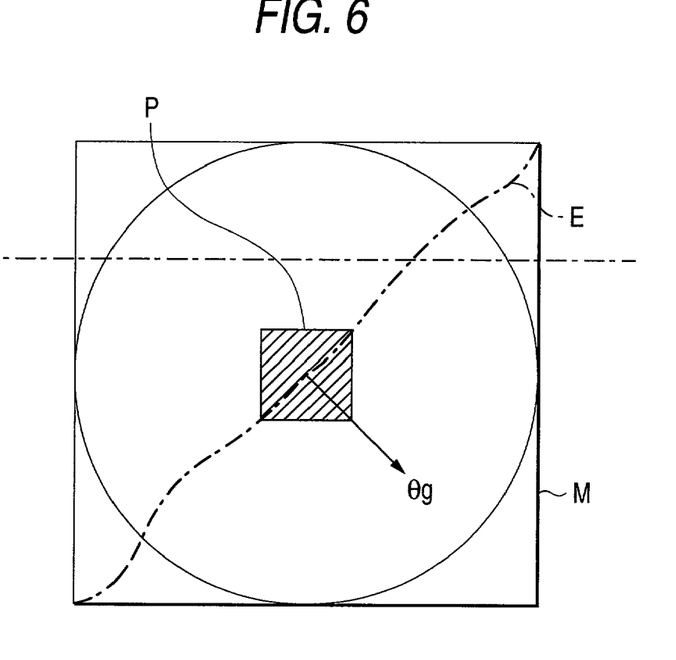
FIG. 6 is a drawing to describe the relationship between the edge and the edge gradient about the pixel of interest in the image processing method according to the embodiment of the invention.

The edge gradient direction θg is the direction in which change in the gradation of the electronic data occurs. Therefore, the direction of edge E and the edge gradient direction θg have vertical relationship as shown in FIG. 6.

(Filter Information Selection Means)

When the edge information calculation means 61 calculates the edge information consisting of the maximum edge amount Gmax and the edge gradient direction θg for each pixel of the CCD 22, the filter information selection means 62 selects filter information recorded in the flash memory 32. The filter information selection means 62 selects the filter information corresponding to the calculated maximum edge amount Gmax and edge gradient direction θg and the smoothing strength from among a plurality of pieces of filter information recorded in the flash memory 32 (S600).

Figure 7:
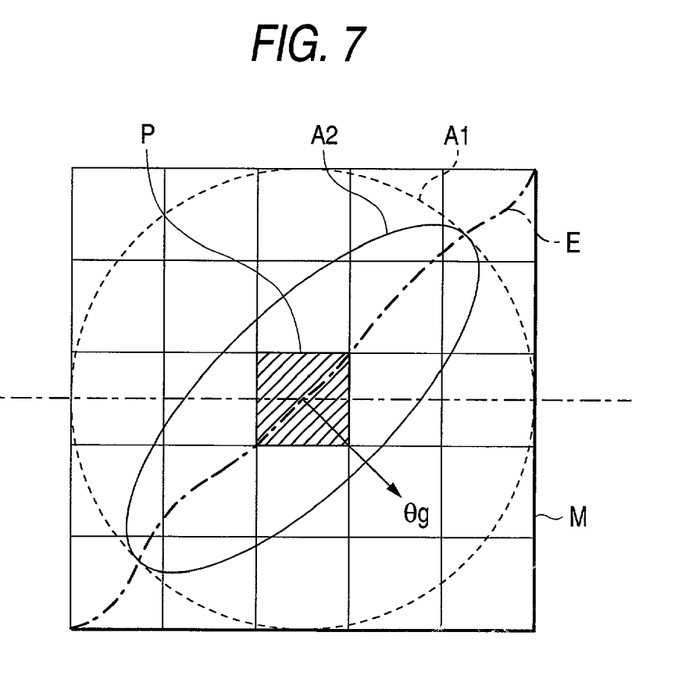
FIG. 7 is a drawing to describe the smoothing range about the pixel of interest in the image processing method according to the embodiment of the invention.

The filter information is provided by deforming a smoothing filter set based on a Gaussian distribution based on the above-mentioned edge information. Here, the principle will be discussed using an example. In the embodiment, a 5×5 matrix M centering on the pixel of interest P is the smoothing range, as shown in FIG. 7.

Not only the edge information, but also the smoothing strength is calculated from the electronic data output from the image input means 20. Based on the electronic data output from each pixel of the CCD 22, the smoothing strength is calculated for the component corresponding to the maximum edge amount Gmax selected by the edge information calculation means 61. The smoothing strength σ is calculated according to the following expression (C). The output value of the component corresponding to the maximum edge amount Gmax in the electronic data, namely, the color difference component Cb in the embodiment is M.

[Expression 5]

$$\sigma = N(M) = \left(\frac{eM}{n}\right)^2 \exp\left(-\frac{2M}{n}\right) \quad (C)$$

In expression (C), e is a natural logarithm and n is the brightness at which noise reaches the maximum. n changes with the photographing condition; for example, in the embodiment wherein output from each pixel is an eight-bit 256-step gradation, n is set to 50 (n=50).

The smoothing range is calculated from the smoothing strength σ calculated according to the expression (C). The smoothing range is found based on the Gaussian distribution described later.

The filter information is provided by deforming the smoothing filter set based on the Gaussian distribution based on the above-mentioned edge information.

The Gaussian distribution is found according to the following expression (D):

[Expression 6]

$$\delta(x, y) = \frac{1}{2\pi\sigma^2} \exp\left(\frac{n^2(x\cos\theta_g - y\sin\theta_g)^2 + m^2(x\sin\theta_g + y\cos\theta_g)^2}{-2\sigma^2}\right) \quad (D)$$

Expression (D) is deformation of a Gaussian distribution expression; it is deformed to an ellipse scaled to 1/n in the minor axis direction and 1/m in the major axis direction and is rotated clockwise by θg. That is, the shape of the ellipse is changed in accordance with m and n and the gradient of the ellipse is changed in accordance with θg. m and n are scaling parameters and depend on the maximum edge amount Gmax of the edge amounts calculated according to the above-described expression (A).

As the maximum edge amount Gmax grows, the values of the scaling parameter m and n (mainly, the value of n) are increased for deforming the ellipse to a flat elliptical shape. As shown in FIG. 7, the smoothing range along the edge E is found by rotating in response to the gradient direction θg. That is, when the values of the scaling parameter m and n are small, smoothing range A1 is circular as indicated by the dashed line in FIG. 7; as the values of the scaling parameter m and n (particularly, the value of n) grow, a smoothing range A2 becomes a flat elliptical shape as indicated by the solid line in FIG. 7.

When the edge amount is small as a result of calculating the edge information about the pixel of interest P, the periphery of the pixel of interest is a flat part. Therefore, the electronic data output from the pixel of interest P needs to be distributed evenly to the pixels surrounding the pixel of interest P. Thus, the smoothing range becomes a circular range centering on the pixel of interest P.

On the other hand, when the edge amount is large, the periphery of the pixel of interest is an edge part. Therefore, the electronic data output from the pixel of interest P needs to be distributed to the pixels along the edge surrounding the pixel of interest P. Thus, the smoothing range becomes an elliptical range along the edge E centering on the pixel of interest P. That is, as the edge gradient grows, smoothing processing along the edge E needs to be executed increasingly.

The filter information set as described above is previously prepared corresponding to the maximum edge amount Gmax, the edge gradient direction θg, and the smoothing strength σ calculated and is recorded in the flash memory 32. therefore, the filter information selection means 62 selects the optimum filter information out of the flash memory 32 based on the maximum edge amount Gmax, the edge gradient direction θg, and the smoothing strength σ calculated. Therefore, the filter information can be provided at high speed as compared with the case where the filter information is calculated each time.

(Smoothing Means)

When the filter information selection means 62 selects the filter information, the smoothing processing means 63 executes smoothing processing from the electronic data output from the pixel of interest P and the selected filter information (S700). That is, processing of the output electronic data is executed. The smoothing processing is executed by multiplying the raw data of the electronic data output from the pixel of interest P by the numeric value of the filter information.

As described above, the filter information selection means 62 selects the filter information based on the maximum edge amount Gmax, the edge gradient direction θg, and the smoothing strength σ calculated from the output values of the pixels making up the matrix surrounding the pixel of interest. The raw data of the electronic data output from the pixel of interest P is multiplied by the filter information, whereby the information of the pixel of interest P is distributed to specific pixels of the 5×5 matrix M centering on the pixel of interest P. As the information of the pixel of interest P is distributed to specific pixels of the matrix M, the smoothing processing is performed for the electronic data of the pixel of interest P.

The smoothing processing is performed for all pixels making up an image, namely, all pixels of the CCD 22. For one pixel, the smoothing processing is performed in 24 pixels surrounding that pixel and thus is executed 25 times per pixel. The sum total of the smoothing processing executed for the surrounding pixels becomes the electronic data resulting from the smoothing processing.

(Write Means)

Upon completion of the smoothing processing by the smoothing processing means 63, the write means 64 writes the complete electronic data into the RAM 31 (S800).

When the write means 64 writes the one-pixel electronic data into the RAM 31, the electronic data stored in the RAM 31 is compressed to reduce the amount of data recorded in the flash memory 32. For the image picked up with the digital camera 1, a file format such as JPEG (Joint Photographic Experts Group) or TIFF (Tagged Image File Format) is used as the compression format. The compressed electronic data is recorded in the flash memory 32.

Next, the operation of the digital camera 1 of the embodiment will be discussed.

(1) If a power switch (not shown) of the digital camera 1 is set to ON, the digital camera enters a standby state in which it can photograph at any time. At this time, in the CCD 22, light gathered through the condensing lens 21 is converted into an electric signal every fraction of a second to every few hundredths of a second. The provided electric signal is converted into digital electronic data by the A/D converter 23. For the user to use the LCD 41 as a finder, the digital electronic data output from the A/D converter 23 is transferred to the VRAM 42 and the photograph subject is displayed as a moving image on the LCD 41.

(2) When a "semi-press" state in which the user presses the shutter button to the midpoint of the operation range is entered, light exposure and focus are set and fixed. The light exposure at the photographing time can be changed as the CPU 11 of the control section 10 controls the aperture of the condensing lens 21 and the shutter speed, namely, the charge storage time of the CCD 22. As the shutter of the digital camera 1, either or both of a mechanical shutter for physically shielding light or an electronic shutter for controlling the charge storage time of the CCD 22 is used.

(3) When a "full-press" state in which the user presses the shutter button to the limit of the operation range is entered, the following processing is performed. First, precise light measurement, focusing, and the like are performed for the subject. Upon completion of the light measurement and focusing, all charges stored in the CCD 22 are once discharged and then light from the subject is incident on the CCD 22 through the condensing lens 41 and the CCD 22 outputs an electric signal based on the amount of charges responsive to the amount of the incident light.

(4) The electric signal output from the CCD 22 is converted into digital electronic data by the A/D converter 23. To speed up, the digital electronic data is temporarily stored in the RAM 31 directly with the address thereof specified not via the CPU 11 of the control section 10 by DMA (Direct Memory Access).

(5) The electronic data stored in the RAM 31 is subjected to the above-described processing by the processing circuit 60 and then is generated as the electronic data of the appropriate color image. To increase the number of records in the flash memory 32, the electronic data is compressed to the electronic data in a file format such as JPEG.

(6) Upon completion of compressing the electronic data, the electronic data is copied into and recorded in the flash memory 32 from the RAM 31.

As described above, according to the image processing method using the digital camera 1 of the embodiment, the edge amounts are calculated from the brightness component Y and the color difference components Cb and Cr separated from the electronic data. Using the component having the maximum edge amount calculated, the edge gradient direction θg and the smoothing strength σ are calculated. Thus, for example, even for an image whose edge cannot be detected based on the brightness component Y because the change amount of the brightness component Y is small, an edge can be detected based on other components. Therefore, the edge detection accuracy is improved and the image can be smoothed based on the detected edge information and noise contained in the image can be removed.

In the embodiment, the filter selection means 62 selects the filter information based on the edge amount G, the edge gradient direction θg, and the smoothing strength σ calculated by the edge information calculation means 61. The filter information is previously prepared in response to the edge amount G, the edge gradient direction θg, and the smoothing strength σ and is recorded in the flash memory 32. Thus, when the edge amount G, the edge gradient direction θg, and the smoothing strength σ are calculated, immediately the filter information is selected out of the flash memory 32. Consequently, even if the CPU 11 having a low processing capability is used, the filter information can be provided at high speed as compared with the case where the filter information is created one by one. Therefore, the time required for image processing can be shortened.

In the embodiment of the invention, the example wherein the YCbCr color space is used as the color space has been described, but RGB color space or absolute color space of Lab can also be used. Although the Prewitt operator is used as the edge detection operator, any other operation such as a Sobel operator may be used.

Further, in the embodiment of the invention, the smoothing processing for removing noise contained in the electronic data has been described as an example of the image processing. However, the invention can be applied not only to the smoothing processing, but also to image processing of detecting an edge and interpolating pixels based on the detected edge, for example.

The invention is not limited at all to the description of the mode for carrying out the invention and the description of the embodiments. The invention includes various modifications that can be conceived easily by those skilled in the art, without departing from the description of the scope of claim.

What is claimed is:

1. An image processing method for processing electronic data of an input image, comprising:

a signal separation step of separating the electronic data into R, G, and B color components;

an edge amount calculation step of calculating the R edge amount, the G edge amount, and the B edge amount for each of the color components provided at said signal separation step;

a maximum edge amount selection step of selecting the maximum edge amount from among the R edge amount, the G edge amount, and the B edge amount calculated at said edge amount calculation step;

an edge information calculation step of calculating edge information of the component corresponding to the maximum edge amount based on the maximum edge amount selected at said maximum edge amount selection step; and an electronic data processing step of processing the electronic data based on the edge information calculated at said edge information calculation step, wherein at said maximum edge amount selection step and said edge information calculation step, the maximum edge amount is selected and the edge information of the component corresponding to the maximum edge amount is calculated for each of pixels of the input image.

2. An image processing program, stored on a computer readable medium, for causing a computer to process electronic data of an input image by executing:

a signal separation step of separating the electronic data into R, G, and B color components;

an edge amount calculation step of calculating the R edge amount, the G edge amount, and the B edge amount for each of the color components provided at said signal separation step;

a maximum edge amount selection step of selecting the maximum edge amount from among the R edge amount, the G edge amount, and the B edge amount calculated at said edge amount calculation step;

an edge information calculation step of calculating edge information of the component corresponding to the maximum edge amount based on the maximum edge amount selected at said maximum edge amount selection step; and an electronic data processing step of processing the electronic data based on the edge information calculated at said edge information calculation step, wherein at said maximum edge amount selection step and said edge information calculation step, the maximum edge amount is selected and the edge information of the component corresponding to the maximum edge amount is calculated for each of pixels of the input image.

3. An image processing apparatus comprising:

image input means, to which image information is input, being capable of outputting the image information as electronic data;

edge information calculation means for detecting R, G, and B color components from the electronic data output from said image input means and calculating edge information about the component having the maximum edge amount, of the color components;

image processing means for processing the electronic data based on the edge information calculated by said edge information calculation means;

record means being capable of recording filter information and the electronic data; and filter information selection means for selecting filter information to process the electronic data based on the edge information calculated by said edge information calculation means.

4. A digital still camera comprising an image processing apparatus as claimed in claim 3.

* * * * *